US012771004B2

(12) United States Patent
Vermeulen et al.

(10) Patent No.: US 12,771,004 B2
(45) Date of Patent: Oct. 20, 2026

(54) FLEXIBLE PLANAR TRANSMISSION LINE WITH A FILTER

(71) Applicant: Delft Circuits B.V., Delft (NL)

(72) Inventors: Kiefer James Vermeulen, Delft (NL); Chun Heung Wong, Delft (NL); Wouter Martinus Gerard Bos, Rotterdam (NL); Robertus Franciscus Maria Van der Brink, The Hague (NL)

(73) Assignee: Delft Circuits B.V., Delft (NL)

( * ) Notice: Subject to any disclaimer, the term of this patent is extended or adjusted under 35 U.S.C. 154(b) by 99 days.

(21) Appl. No.: 18/700,810

(22) PCT Filed: Oct. 10, 2022

(86) PCT No.: PCT/NL2022/050577
§ 371 (c)(1),
(2) Date: Apr. 12, 2024

(87) PCT Pub. No.: WO2023/075595
PCT Pub. Date: May 4, 2023

(65) Prior Publication Data

US 2024/0421459 A1 Dec. 19, 2024

(30) Foreign Application Priority Data

Oct. 25, 2021 (NL) ...................................... 2029508

(51) Int. Cl.
*H01P 3/02* (2006.01)
*H01P 1/20* (2006.01)

(52) U.S. Cl.
CPC . *H01P 3/02* (2013.01); *H01P 1/20* (2013.01)

(58) Field of Classification Search
CPC ............. H01P 3/02; H01P 1/20; H01P 1/2039
See application file for complete search history.

(56) References Cited

U.S. PATENT DOCUMENTS 6,507,320 B2 * 1/2003 Von Stein ............ H01Q 21/245 343/768
6,621,384 B1 * 9/2003 Handforth .............. H01P 3/087 333/238

(Continued)

FOREIGN PATENT DOCUMENTS

WO 01/80348 A1 10/2001
WO WO-2010073410 A1 * 7/2010 ................ H01P 7/08

OTHER PUBLICATIONS

Anonymous: "Via fence", Sep. 2 20221, pp. 1-4, retrieved from https://en.wikipedia.org/w/index.php?title=Via_fence&oldid=1042031238.

(Continued)

*Primary Examiner* — Andrea Lindgren Baltzell
*Assistant Examiner* — Kimberly E Glenn
(74) *Attorney, Agent, or Firm* — Ipsilon USA—NLO

(57) ABSTRACT

The invention relates to a flexible planar transmission line for communication between a first electronic device and a second electronic device. The flexible planar transmission line comprises a first conducting layer, a dielectric layer, a second conducting layer, a signal line provided in the dielectric layer and a concatenation of a first filter and a second filter, wherein the first filter being arranged to attenuate frequency components of a signal and a second filter being arranged to attenuate higher order modes of the propagated signal.

20 Claims, 4 Drawing Sheets

(56) References Cited

U.S. PATENT DOCUMENTS

| | | | | |
|---|---|---|---|---|
| 2004/0048420 | A1* | 3/2004 | Miller | H01P 3/084 438/106 |
| 2008/0284545 | A1 | 11/2008 | Keefe | |
| 2009/0102580 | A1 | 4/2009 | Uchaykin | |
| 2021/0111470 | A1 | 4/2021 | El Bouayadi et al. | |

OTHER PUBLICATIONS

Thalmann et al: "Comparison of cryogenic low-pass filters", Review of scientific instruments, American Institute of Physics, Melville NY 11747, vol. 88 No. 11, Nov. 17, 2017.

Mueller, Filipp et al: "Printed circuit board metal powder filters for low electron temperatures", Review of scientific instruments, Melville NY 11747, vol. 84. No. 4, Apr. 1, 2013.

* cited by examiner

FLEXIBLE PLANAR TRANSMISSION LINE WITH A FILTER

FIELD OF THE INVENTION

The invention relates to a flexible planar transmission line for communication between a first electronic device and a second electronic device.

BACKGROUND

The planar flexible transmission line can be applied for transmitting and receiving signals between an electronic system and a cryogenic circuit.

The cryogenic circuit may comprise, for example, qubit devices, quantum processors, sensing and detector systems, quantum internet apparatus, medical devices, cryptographic devices, classical computing processors, and any other electronic devices. However, there are many other applications using cryogenic electronic circuits, such as multi-pixel superconducting photon detectors used in astronomy and quantum communication applications.

Cryogenic cooling equipment is provided for maintaining the cryogenic electronic circuit at the required operating temperature of near zero Kelvin. This cryogenic cooling equipment is often built up from a stack of separated temperature stages, wherein each lower stage is cooled down to a lower temperature. Due to the fundamentals of thermodynamics, the power required to progressively cool down to lower temperatures increases exponentially. For example, a typical cryogenic cooling equipment consumes 20-30 kW for handling a thermal load of 12-18 μW at 100 mK. The control device for cryogenic systems is typically placed outside the cryogenic equipment to prevent their power dissipation from heating up the cryogenic equipment as a whole and thus the cryogenic circuits as well. Therefore, a communication path is required for exchanging signals between cryogenic circuits at the final stage of the cryogenic equipment, through the top of the cryogenic equipment to an electronic system, for example outside control electronics. Such path is typically constructed from a cascade of semi rigid transmission lines, usually coax cables, to abridge the distance during the cooling down procedure and operation. Cryogenic circuits, such as the qubit devices, require communication with the external control device for controlling the qubits and signaling back an actual state of each qubit to the control device. This requires also high frequency, HF, analogue signals. Typically, this signal can be in the range from low frequencies or DC to ultrahigh frequencies up to 80 GHz.

Furthermore, recent cryogenic qubit devices have an increasing number of qubits. Each qubit requires individual communication to the control device outside the cryogenic qubit device. This individual communication requires an increasing number of the transmission lines for the qubits. For example, the cryogenic qubit device can comprise 96 qubits and requires at least 288 individual transmission lines that should be guided through subsequent thermal stages to the outside. Flexible planar transmission lines comprise a number of signal lines and can be applied to carry multiple signals from the control device to the qubits of the cryogenic device and can provide a high density of signal lines. Performance of qubits requires reduction of thermal noise at the input of the qubits in the cryogenic qubit devices. Such noise reduction can be obtained through filters in series with the signal lines. In practice at least 40-60 dB attenuation outside the band for operation of the qubits is typically required.

A planar transmission line is known from US 2021/0111470 A1. The known flexible planar transmission line comprises a filter formed by a localized flexible material modification at the end of the flexible planar transmission line attached to a rigid board. The flexible planar transmission line comprises a window in the flexible material comprising a polymer with different electric and magnetic loss tangent and permeability. The polymer comprises conductive or non-conductive particles to increase the attenuation.

A disadvantage of the known planar transmission line is that the level of the propagated signal is attenuated up to a dedicated cut-off frequency and above this dedicated cut-off frequency the level of the signal remains about constant, for example the attenuation remains in the range between 40 and 60 dB above 6 GHz.

SUMMARY OF THE INVENTION

It is therefore an object of the invention to mitigate the above indicated problems and to provide a flexible planar transmission line that enables miniaturization, scalability, and having improved filter characteristics.

According to a first aspect of the invention this and other objects are achieved by a flexible planar transmission line for communication between a first electronic device and a second electronic device, the flexible planar transmission line comprising a first conducting layer, a dielectric layer, a second conducting layer, a signal line provided in the dielectric layer and a concatenation of a first filter and a second filter, the first filter being arranged to attenuate frequency components of a signal and the second filter being arranged to attenuate higher order modes of the signal. In this arrangement the first filter attenuates the frequency components of a signal and has a transfer function that is of low-pass nature. The inventors recognized that the transmission of a signal through the first filter and the flexible planar transmission line can be described through multiple modes, the ground mode, and multiple higher order modes. The $TE_{10}$ mode is in this disclosure is the most dominant higher order mode with the lowest cut-off frequency. Furthermore, the inventors recognized that higher EM modes will be excited at locations where the geometry of the planar transmission line changes, for example, at the beginning of the first filter. The frequency components of the ground mode can be filtered as desired but the frequency components in the higher order EM modes propagate well above a dedicated cut-off frequency and may not be attenuated as desired by the first filter. Since remaining higher order EM modes convert back to the ground mode after the first filter, the entire mechanism of mode conversion and propagation of higher order EM modes will manifest itself as leakage of frequency components through the first filter.

Furthermore, the inventors recognized that increasing the amount of filtering by the first filter is not effective since the overall filtering is limited by leakage. Therefore, the attenuation of the first filter is restricted, and attenuation of 1 dB/GHz can be obtained up to about 20 dB at 20 GHz. Furthermore, the inventors recognized that by concatenation of a second filter, dedicated to attenuating the frequency components in these higher order EM modes, the overall leakage through the combination of filters reduces. In this arrangement, the concatenation of the first filter and the second filter provides a predetermined attenuation of frequency components of the transferred signal over a wider frequency range, wherein the contribution of the higher order modes in the transferred signal are at a low level with respect to the transferred signal.

In this arrangement the second filter acts as a high pass filter for higher order EM modes through the attenuation of these modes. The second filter attenuates higher order EM modes below the cut-off frequency. For example, the frequency for the passing of the $TE_{10}$ mode of the signal through the second filter can be 100 GHz.

A concatenation of the first filter, the second filter, and again the first filter and the second filter reduce the leakage through the combination of filters even further. For example, an effective attenuation of 80 dB at 6 GHz."

In a preferred embodiment according to this disclosure the first filter further comprises a first chamber between the signal line and the first conducting layer, and a second chamber between the signal line and the second conducting layer, wherein the first chamber and the second chamber comprise an electro-magnetic, EM, absorbing material. In this arrangement an improved coupling between the signal line and the EM absorptive material is obtained because the distance between the EM absorptive material and the signal line is reduced, resulting in an improved response up to the cut-off frequency. The transmission of the first filter and second filter can be determined by, for example, the dimensions of the first chamber and second chamber along the flexible planar transmission line. This arrangement enables a symmetric arrangement with respect to the signal line. Furthermore, in this arrangement the volume of the flexible transmission line is reduced and because the rigid printed circuit board of the transmission line is eliminated. Furthermore, thermalization and/or heatsinking can be improved. A further advantage is that the flexible transmission line remains flexible over its entire length as the EM absorbing material is enclosed in the flexible transmission line.

In a further embodiment according to this disclosure the flexible planar transmission line has a first width $W_L$, the second filter comprises a first electrically conducting wall and a second electrically conducting wall respectively at either side of and parallel to the signal line, the first conducting wall and the second conducting wall connecting the first and second electrically conducting layers, and a second width $W_g$ between the first conducting wall and the second electrically conducting wall is smaller than the first width $W_L$. The second filter transfer the signal and acts has a low-pass filter that attenuates higher order EM modes because of the increased cut-off frequency of the narrowed portion of the planar flexible transmission line formed by the first electrically conducting wall and the second electrically conducting wall compared to the cut-off frequency of the portion of the planar flexible transmission line before the second filter seen in the direction of propagation. For example, the cut-off frequency for the passing signal for the second filter can be 86.6 GHZ.

In a further embodiment according to this disclosure the first electrically conducting wall comprises first conducting vias arranged along a first line besides and parallel to the signal line and the second conducting wall comprises second conducting vias arranged along a second line besides and parallel to the signal line, The conducting vias are effectively determining the second width $W_g$ of the flexible planar transmission line. Furthermore, the conducting vias can be easily provided in the flexible transmission line. The number of vias can be at least one at each side of the signal line. In embodiments this number can be three at each side of the signal line.

In a further embodiment according to this disclosure the flexible planar transmission line comprises a transmission portion having a first characteristic impedance, a first filter portion comprising the first filter, and a second filter portion comprising the second filter, the first filter portion having a second characteristic impedance, the second filter portion having a third characteristic impedance and the second characteristic impedance and/or the third characteristic impedance match the first characteristic impedance. In this arrangement each portion of the flexible planar transmission line can be matched to obtain the first characteristic impedance over the full length of the flexible planar transmission line.

A characteristic impedance of a portion of the flexible planer transmission line can be determined by the following parameters a width of the signal line, a distance between the signal line and the conductive layer, and a dielectric constant of the dielectric layer.

In a further embodiment according to this embodiment a cross-section of the signal line of the second filter portion is adapted to match the second characteristic impedance of the first filter portion to the first characteristic impedance of the transmission section of the flexible planar transmission line.

In a further embodiment according to this disclosure a distance between the signal line and at least one of the first electrically conducting layer and the second electrically conducting layer in the second filter portion is adapted to match the third characteristic impedance of the second filter portion to the first characteristic impedance. In this arrangement each portion of the flexible planar transmission line can be matched to obtain the first characteristic impedance over the full length of the flexible planar transmission line.

In a further embodiment according to this disclosure the cross-section of the signal line of the second filter portion of the transmission line is adapted to match the third characteristic impedance of the second portion of the flexible planar transmission line to the first characteristic impedance.

In a further embodiment according to this disclosure the signal line of the first filter is conforming a meander shape. In this arrangement wherein the layout of the signal line of the first filter is meander shaped and a compact lay-out of the first filter can be obtained.

In a further embodiment according to this disclosure the EM absorptive material comprises EM absorptive particles and a binder. The EM absorptive particles may comprise electrically conducting particles, semi-conductive particles or electrically resistive particles. The electrically conductive particles are clustered in clusters consisting of one or several particles in the binder, wherein the clusters are separated by the binder. The EM absorptive particles may comprises at least one of Al, Cu, Fe, FeO, $Fe_2O_3$, NiCr, Pt, Indium Tin Oxide, ITO, brass, bronze, stainless steel, C, Ge, Se or Si.

In a further embodiment according to this disclosure the binder is one of liquid polyimide, polytetrafluoroethylene, PTFE, resin, polyurethane, fluorinated ethylene propylene, FEP, and ethylene tetrafluoroethylene, ETFE.

The invention further relates to an electronic device comprising a flexible planar transmission line according to any of the claims 1-13.

These and other features and effects of the present invention will be explained in more detail below with reference to drawings in which preferred and illustrative embodiments of the invention are shown. The person skilled in the art will realize that other alternatives and equivalent embodiments of the invention can be conceived and reduced to practice without departing from the scope of the present invention.

DETAILED DESCRIPTION OF EMBODIMENTS

In the figures like numerals refer to like parts. The invention is explained with reference to FIGS. 1 to 7. The flexible planar transmission line can be used for communication between a first electronic device and a second electronic device. The first electronic device can be, for example, an electronic circuit at room temperature and the second electronic device can be, for example, a cryogenic electronic circuit at a temperature of about 10 mK. The cryogenic circuit can be, for example, a qubit device. Other cryogenic circuits can be, for example, multi-pixel superconducting photon detectors used in astronomy.

Figure 1:
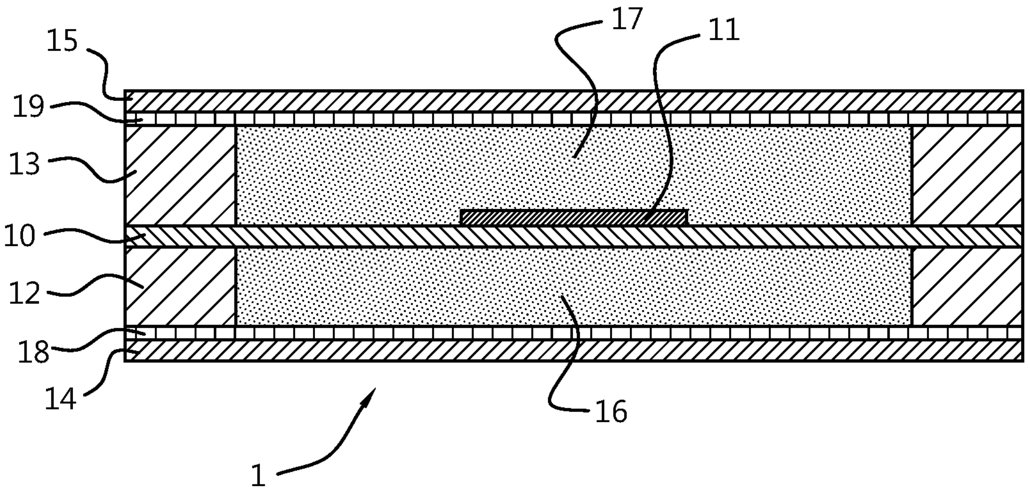
FIG. 1 shows a cross-section of a flexible planar transmission line comprising a first filter according to an embodiment according to this disclosure.

FIG. 1 shows diagrammatically a cross-section 1 of a flexible planar transmission line comprising a first filter according to an embodiment of this disclosure. The cross-section is orthogonal to the length direction of the flexible planar transmission line. The flexible planar transmission line comprises a carrier 10 made of, for example, a polyimide layer with a thickness in the range between 12 and 75 μm, for example 50 μm and a width of 2 mm. Furthermore, the carrier is provided with a signal line 11 made of a conductor, for example, silver, Ag, having a width of 150 μm and a thickness of 2 μm. In embodiments, instead of a layer of a conductor, a layer comprising a superconductor can be applied, for example, one of Aluminum, Al, Niobium Nb, Niobium Titanium, NbTi, Niobium Titanium nitride, NbTiN, and Indium, In. The thickness of the superconductor layer can be, for example, 200 nm.

Furthermore, the flexible planar transmission line 1 further comprises dielectric layers 12, 13 made of, for example, polyimide, provided on opposite sides of the carrier 10. The dielectric layers 12, 13 have a thickness of 150 μm respectively and have the same width of the carrier 10. The signal line 11 is within and between the dielectric layers 12, 13. Furthermore, the flexible planar transmission line is provided with a first conducting layer 14 and a second conducting layer 15 at the outer sides of the first and second dielectric layers 12, 13 respectively. The conducting layers 14, 15 can be silver provided by thin film processing as is well known to the skilled person.

Furthermore, the flexible planar transmission line is provided with a first filter. In this embodiment the first filter comprises a first chamber 16 and a second chamber 17 provided in the dielectric layers 12, 13 between the signal line 11 and the first conducting layer 14, and the signal line 11 and the second conducting layer 15 respectively. In embodiments the first filter may comprise only the first chamber. Furthermore, the widths of the first chamber 16 and second chamber 17 extends over the width of the signal line 11. The width of the first chamber and the second chamber can be, for example, three times the width of the signal line 11 in this embodiment the width is 450 μm.

In an embodiment, closing sheets 18, 19 made of polyimide, for example, ethylene tetrafluoroethylene, ETFE or polytetrafluorethylene, PTFE can be provided between the first conducting layer 14 and the first chamber 16, and the second conducting layer 15 and second chamber 17 respectively for closing the first chamber 16 and the second chamber 17. The thickness of the closing sheets can be 50 μm. The heights of the first and second chambers extends from the closing sheets 18, 19 to the carrier 10.

Furthermore, a length Lr of the first chamber 16 and the second chamber 17 is defined along the signal line 11. The first and second chambers 16, 17 are filled up with EM absorptive material. The EM absorptive material comprises EM absorbing particles and a binder. In an embodiment the EM absorptive particles are electrically conducting particles, For example the electrically conducting particles consist of, for example, Cu. Also, other electrically conducting particles can be used for example made of Fe, $Fe_2O_3$. NiCr, Pt, Indium Tin Oxide, ITO, bronze, brass, or stainless steel. The electrically conductive particles are clustered in clusters consisting of one or several particles in the binder, wherein the clusters are separated by the binder. The diameter of the electrically conducting particles should be smaller than half of the distance between the signal line and one of the electrically conducting layers and can be for example in the range of 0.1 μm to 50 μm. The binder can be liquid polyimide. Also, other binders can be used, for example, PTFE resin, polyurethane fluorinated ethylene propylene, FEP or ETFE. In an embodiment the volume ratio between the total volume of the Cu-particles and the volume of the binder is in the range between 1:1 to 1:5. In this embodiment the volume ratio is 1:2. The first filter can be dimensioned for an attenuation of 1 dB/GHz.

Furthermore, in embodiments the EM absorptive particles comprise electrically resistive particles, for example amorphous carbon, non-electrically conducting particles, for example, epoxy magnetite particles. In embodiments the EM absorptive particles are semiconductive particles for example Ge, Se or Si particles.

Furthermore, the flexible planar transmission line can be assembled by adjoining the respective layers. Thereto, a thin adhesive layer can be applied between the layers.

Figure 2:
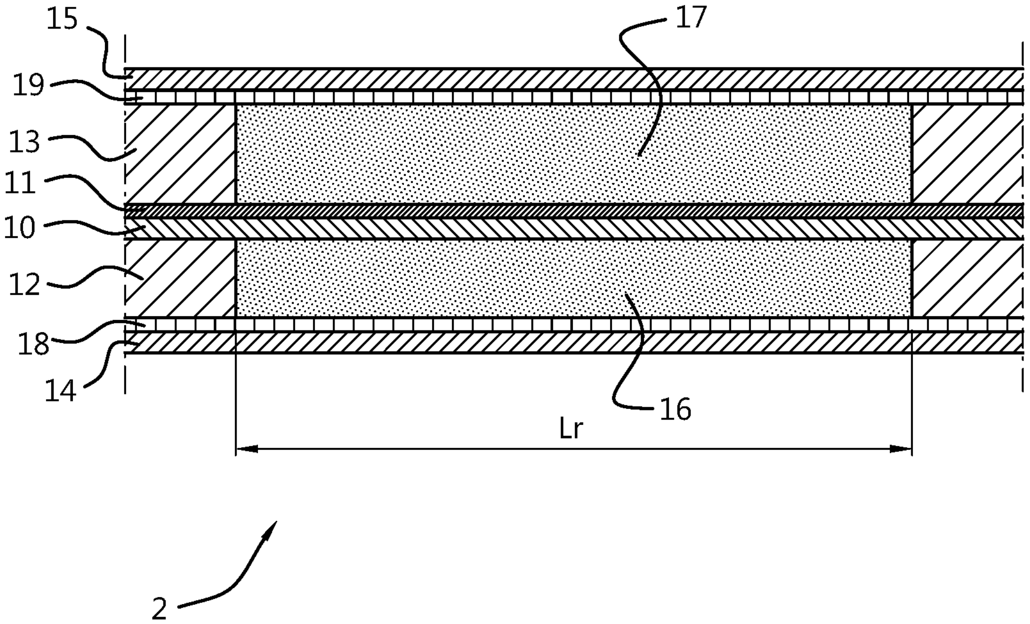
FIG. 2 shows a cross-section of a flexible planar transmission line comprising a first filter according to an embodiment according to this disclosure.

FIG. 2 shows a cross-section 2 of the flexible planar transmission line 1 comprising the first filter. The flexible planar transmission comprises a transmission portion and a first filter portion comprising the first filter. In FIG. 2 the cross-section is parallel to the length of the flexible planar transmission line. The cross-section comprises the first chamber 16, the second chamber 17 and the signal line 11.

The length Lr of the first chamber 16 and the second chamber 17 of the first filter respectively is defined in the direction of the signal line 11.

The inventors recognized that the transmission of a signal through the first filter and the flexible planar transmission line can be described through multiple modes, the ground mode, and multiple higher order modes. The $TE_{10}$ mode is in this disclosure is the most dominant higher order mode with the lowest cut-off frequency. Furthermore, the inventors recognized that higher EM modes will be excited at locations where the geometry of the planar transmission line changes, for example, at the beginning of the first filter. The frequency components of the ground mode can be filtered as desired by the first filter but the frequency components in the higher order EM modes propagate well above a dedicated cut-off frequency and may not be attenuated as desired by the first filter. Since remaining higher order EM modes convert back to the ground mode after the first filter, the entire mechanism of mode conversion and propagation of higher order EM modes will manifest itself as leakage of frequency components through the first filter. Enlarging the length of the first chamber 16 and the second chamber 17 and maintaining the other dimensions of the first chamber and the second chamber constant is not effective because the overall filtering is limited by leakage. Therefore, the lengths Lr of the first chamber 16 and the second chamber 17 should be restricted and an attenuation of, for example 1 dB/GHz can be obtained up to about 20 dB at 20 GHZ.

Furthermore, the transmission portion of the flexible planar transmission line has a first characteristic impedance, and the first filter portion has a second characteristic impedance. The second characteristic of the first filter portion can be adapted to match the first characteristic impedance. For example, by changing the cross-section, either the width or height of the signal line 11 or changing the distance between the signal line 11 and the first and second conducting layers 18, 19 or the dielectric constant of the dielectric layer.

In embodiments the dimensions of the second chamber can be different than those of the first chamber.

Figure 3:
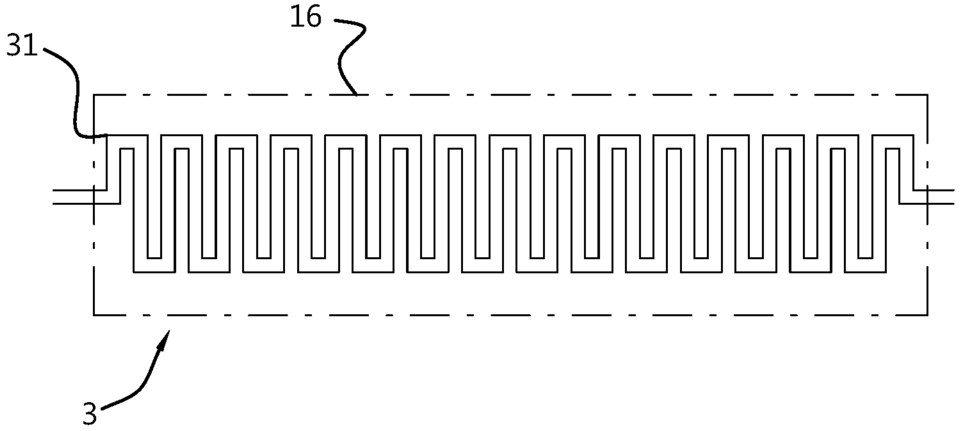
FIG. 3 shows an intersection of a flexible planar transmission line comprising a first filter according to an embodiment according to this disclosure.

FIG. 3 shows a cross-section 3 of the flexible planar transmission line and the first filter of an embodiment according to this disclosure. The cross-section of the signal line 31 is parallel to the plane of the carrier 10 in the length of the flexible planar transmission line and shows the signal 31 and the first chamber 16. Furthermore, this embodiment also comprises the second chamber 17 (not shown), the dimensions of the second chamber are about equal to the dimensions of the first chamber. In this embodiment the signal line 31 is meander shaped along the length of the first chamber 16 and second chamber 17. In this arrangement a compact first filter can be obtained. In this embodiment the length of the signal line 31 meandering adjacent to the first chamber 16 and the second chamber 17 determines the transmission of the signal.

Furthermore, also in this embodiment the length of the signal line along the first and second chamber is restricted such that the ground mode contribution of the propagated signal remains larger than the higher order mode contribution due to the leakage from the higher order modes to the ground mode.

In embodiments the dimensions of the second chamber can be different than those of the first chamber.

Figure 4:
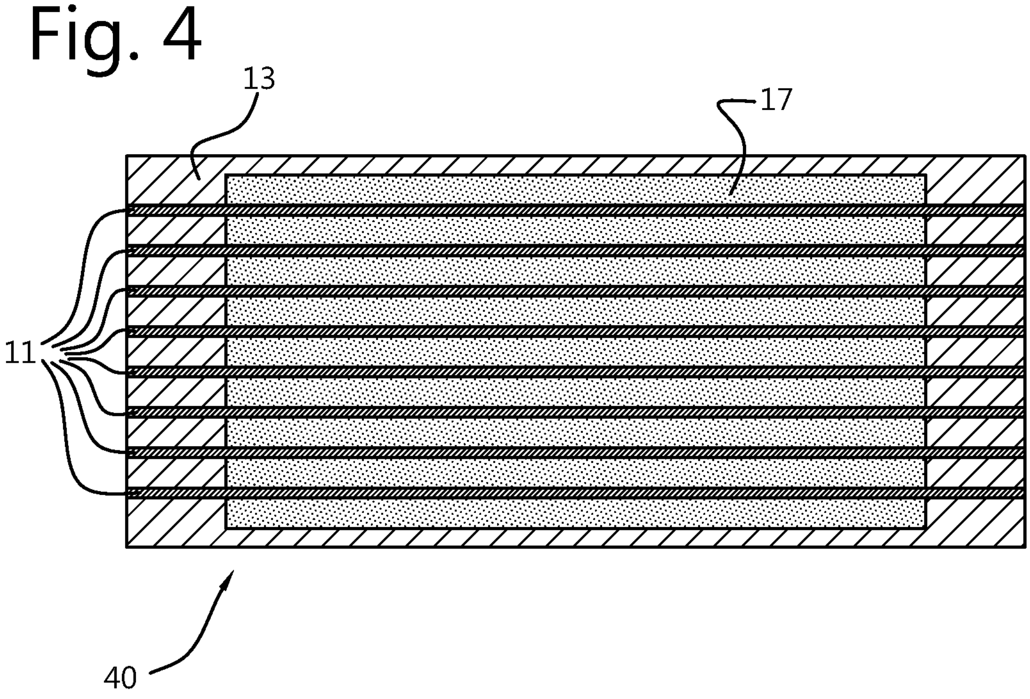
FIG. 4 shows an intersection of a flexible planar transmission line comprising multiple signal lines according to an embodiment of this disclosure.

FIG. 4 shows an intersection of a flexible planar transmission line 40 with multiple signal lines 11 according to an embodiment of this disclosure. The cross-section comprises the dielectric layer 13, the second chamber 17 and eight signal lines 11. The mutual spacing between the signal lines 11 can be, for example, 1 mm. The eight signal lines 11 are evenly distributed along the width of the first chamber 16 and the second chamber 17. The width of the signals lines 11 is 150 μm. The width of the planar flexible transmission line can be, for example 10 mm. In an embodiment instead of a single first chamber 16 and a single second chamber 17 separated first chambers and separated second chambers for respectively each of the signal lines 11 can be applied.

Figure 5A:
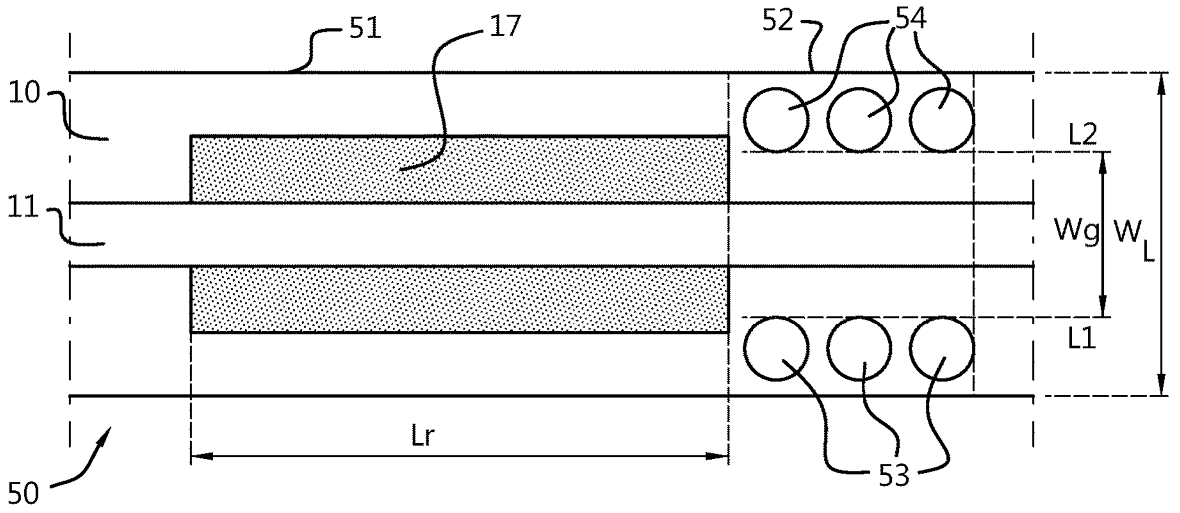
FIG. 5A shows an intersection of a flexible planar transmission line comprising a first filter and a second filter according to an embodiment of this disclosure.

FIG. 5A shows diagrammatically a cross-section of a flexible planar transmission line 50. The flexible planar transmission comprises a transmission portion, a first filter portion provided with a first filter 51 and a second filter portion provided with a second filter 52 according to an embodiment according to this disclosure. The cross-section is in the plane of the carrier 10 in the direction of the signal line 11. The flexible planar transmission line has a first width $W_L$ and the transmission portion has a first characteristic impedance. Furthermore, the first filter portion has a second characteristic impedance, and the second filter portion has a third characteristic impedance.

The first filter 51 is according to one of the embodiments described hereinbefore and comprises the first and second chambers. FIG. 5 shows only the second chamber 17. The attenuation of the first filter 51 according to this embodiment can designed to be about 1 dB per GHz. Furthermore, the inventors recognized that by concatenation of a second filter 52, dedicated to attenuating the frequency components in the higher order EM modes, the overall leakage through the combination of filters reduces. In this embodiment, the concatenation of the first filter 51 and the second filter 52 provides a predetermined attenuation of frequency components of the transferred signal over a wider frequency range, wherein the contribution of the higher order modes in the transferred signal are at a low level with respect to the transferred signal.

In this arrangement the second filter 52 acts as a high pass filter for higher order EM modes through the attenuation of these modes. The second filter 52 attenuates higher order EM modes below the cut-off frequency. For example, the frequency for the passing of the $TE_{01}$ mode of the signal through the second filter can be 100 GHz.

A concatenation of the first filter, the second filter, and again the first filter and the second filter reduce the leakage through the combination of filters even further. For example, an effective attenuation of 80 dB at 6 GHz.".

In this disclosure higher frequency means a frequency higher than the cut-off frequency of the $TE_{10}$ mode of the flexible planar transmission line 50. This first cut-off frequency $f_{c1}$ of the first filter is determined by formula (1)

$$f_{c1} = \frac{c}{2*\left(\sqrt{\varepsilon_r}*W_m\right)}, \tag{1}$$

wherein c represents the speed of light in vacuum, $\varepsilon_r$ represent a relative dielectric constant of the medium and $W_m$ represents the width of the meander structure of the first filter 51. In this embodiment according to formula (1) and for a value of the dielectric constant $\varepsilon_r$=3 the first cut-off frequency $f_{c1}$ of the first filter is about 8.66 GHZ.

The second filter 52 attenuates higher order EM modes below the cut-off frequency. In this embodiment the second filter 52 comprises a first electrically conducting wall and a second electrically conducting wall respectively at either side of and parallel to the signal line 11. The first conducting wall is formed by first conducting vias or through holes 53 arranged along a first line L1 at a first side of and parallel to the signal line 11 and the second conducing wall is formed by second conducting vias or through holes 54 arranged along a second line L2 at another side and parallel to the signal line 11. The first electrically conducting vias 53 and the second electrically conducting vias 54 are connecting the first conducting layer 14 and the second conducting layer 15. The number of first conducting vias and second conducting vias at either side of the signal line is at least one. In this embodiment this number is three. The distance between adjacent first conducting vias 53 is 1 mm. and the distance between adjacent second conducting vias 54 is also 1 mm. A second width We between the first line L1 and the second line L2 is equal to the distance between opposing or corresponding first conducting vias 53 and the second conducting vias 54. The second filter 52 attenuates higher order EM modes below the second cut-off frequency. This second cut-off frequency $f_{c2}$ of the second filter is determined by $$f_{c2} = \frac{c}{2*(\sqrt{\varepsilon_r}*W_{G})} \quad (2)$$

wherein c represents the speed of light in vacuum, $\varepsilon_r$ represent a dielectric constant of the medium and $W_G$ represents the width between opposing vias. In this embodiment the dielectric constant $\varepsilon_r=3$ and $W_G=1$ mm. The second cut-off frequency of the second filter is according to formula (2) is 86.6 GHZ.

Furthermore, a second characteristic impedance of the first filter portion and a third characteristic impedance of the second filter portion can be matched to the first characteristic impedance of the transmission portion of the flexible planar transmission line. For example, the cross-section of the signal line 11 of the first filter 51 and/or the second filter 52 can be adapted by changing the width or height of the signal line 11 of the first and/or second filter, or by changing the distance between the signal line 11 and the first and second conducting layers 18,19 of the first filter 51 and/or the second filter 52 or the dielectric constant can be adapted.

In embodiments the flexible planar transmission lines comprises multiple first filter and multiple second filters arranged in a concatenation of alternately the first filter and the second filter. Furthermore, the concatenation of the first and second filter may include a third filter. The third filter may comprise a low pass filter, a band pass filters or a high pass filter. The third filter may comprise resistive, capacitive, or inductive elements, as well as, stubs, slits, loops, single transmission lines and coupled transmission lines.

Figure 5B:
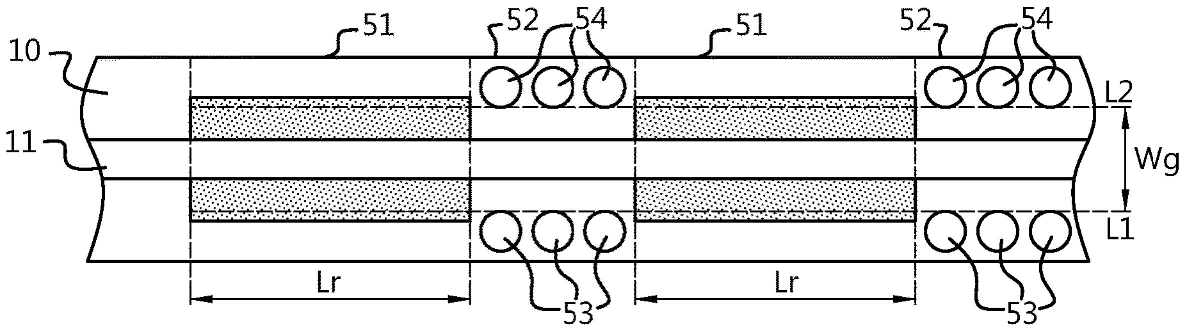
FIG. 5B shows diagrammatically a cross-section of a flexible planar transmission line provided with a concatenation of a first filter, a second filter, the first filter and the second filter according to an embodiment according to this disclosure.

FIG. 5B shows diagrammatically a cross-section of a flexible planar transmission line 50 provided with a concatenation of alternately a first filter 51, a second filter 52, the first filter 51 and the second filter 52 according to an embodiment according to this disclosure.

The functioning of the first pair of the first filter 51 and the second filter 52 is described with respect to FIG. 5A. The concatenation of the first filter, the second filter, and again the first filter and the second filter reduce the leakage through the combination of filters 51, 52 even further. In this arrangement of the concatenation of alternately the first filters 51 and the second filters 52 an attenuation in the propagated signal of, for example, 80 dB at 6 GHz can be obtained.

Figure 6:
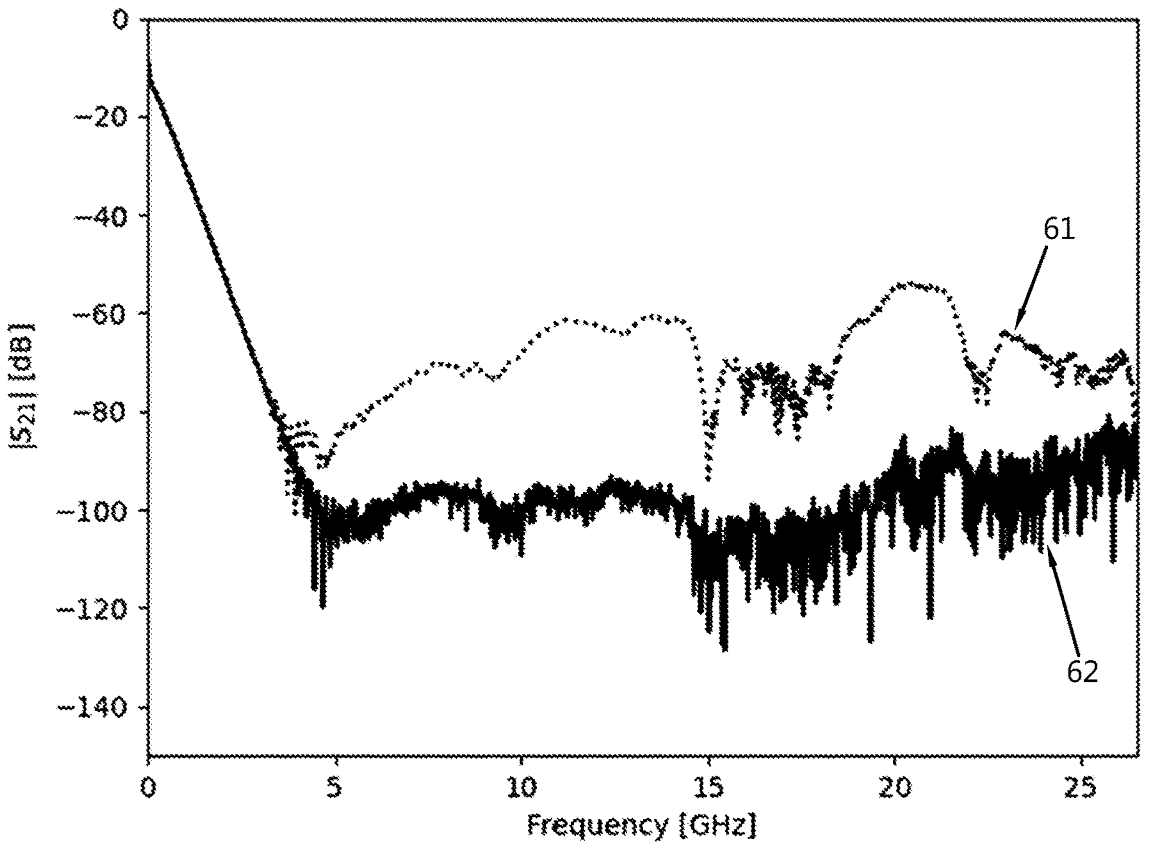
FIG. 6 show respectively graphs of the attenuation through the first filter and through the cascade of the first filter and the second filter.

FIG. 6 shows a first graph 61 of the attenuation of a flexible planar transmission line comprising a first filter 51 as described with respect to FIG. 5 and a second graph 62 of the propagation of a transmission line comprising the concatenation of the first filter 51 and the second filter 52 as described with respect to FIG. 5. The attenuation of the flexible transmission line is measured with a vector network analyzer, VNA.

Graph 61 shows the attenuation of the first filter 51 of 20 dB per GHz and about 60 dB at 3 GHz. Graph 61 shows the contribution of leakage of higher order EM modes through an implementation of the first filter which contribution is visible above 4 GHz. The first width $W_L$ of the flexible planar transmission line is 2 cm.

Graph 62 shows the attenuation of the concatenation of the first filter 51 and second filter 52. The second filter is formed by the electrically conducting first vias and the second electrically conducting vias separated by the second width $W_g$ between corresponding vias of 2.5 mm. The attenuation is 20 dB/GHz which can be measured until a noise floor of the VNA is reached. Furthermore, graph 62 shows a reduction in the leakage by the higher order EM modes above 4 GHz. This was achieved through to the second filter 52.

Figure 7:
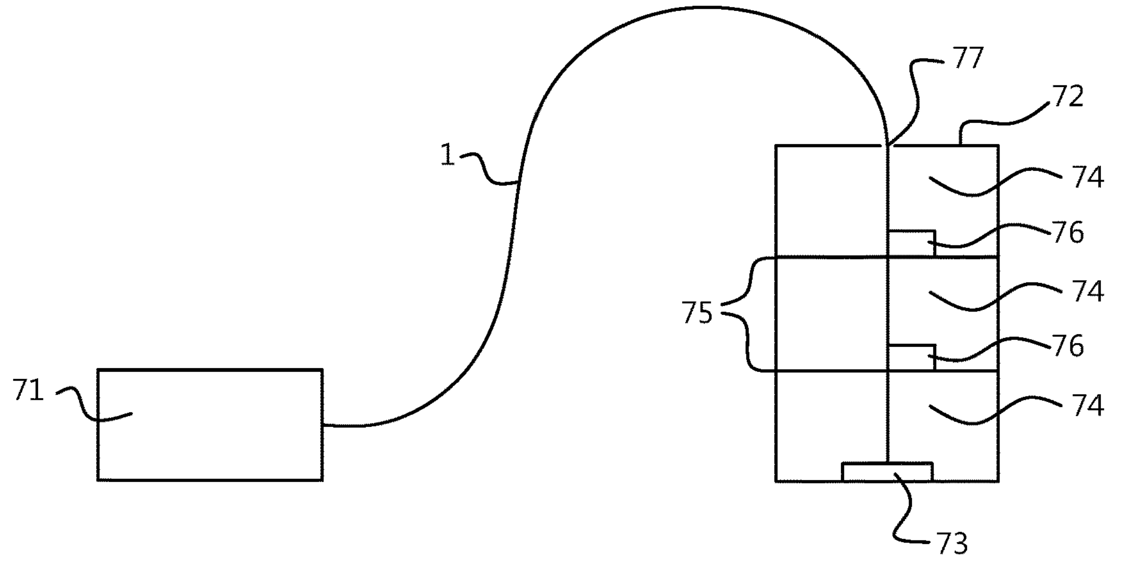
FIG. 7 shows an electronic device, a cryogenic circuit, and a flexible planar transmission line according to an embodiment of this disclosure.

FIG. 7 shows an electronic system comprising a first electronic device 71, a second electronic device 73 and a flexible planar transmission line 1 according to an embodiment of this disclosure described with respect to of FIGS. 1-5. In this arrangement the first electronic device 71 is an electronic control circuit. The second electronic device 73 is a cryogenic circuit provided in a cryogenic cooling device 72 and the transmission line 1 provides communication between the electronic control circuit and the cryogenic circuit. The cryogenic cooling device 72 can be a dilution refrigerator that has several stages 75 each kept on a predetermined temperature to bridge the environment temperature of 290 K to the cryogenic temperature of, for example, 10 mK. Furthermore, the cryogenic device comprises chambers 74 separated by the stages 75 provided with apertures large enough to pass the flexible planar transmission line 1. The stages 75 can be provided with clamping devices 76 made of a thermal conductive material to keep the portion of the transmission line passing the apertures at the temperatures of the respective plates. The flexible planar transmission line 1 enters the dilution refrigerator 72 through a dedicated port 77 and the planar flexible transmission line including the first filters and second filters can be arranged such that the sections of the first filter 51 and second mode filters 52 are in thermal contact with the clamping devices 76.

Although illustrative embodiments of the present invention have been described with reference to the accompanying drawings, it is to be understood that the invention is not limited to these embodiments. Various changes or modifications may be affected by one skilled in the art without departing from the scope or the spirit of the invention as defined in the claims. Accordingly, reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that the features, structures, or characteristics may be combined in any suitable manner in one or more embodiments.

The invention can be summarized by the following clauses:

1. A flexible planar transmission line for communicating between a first electronic device and a second electronic device, the flexible planar transmission line comprising a first conducting layer, a dielectric layer, a second conducting layer, a signal line provided in the dielectric layer and a first filter arranged to propagate a signal, wherein the first filter comprises a first chamber provided in the dielectric layer between the signal line and the first conducting layer, wherein the first chamber comprises EM absorptive material.
2. The flexible planar transmission line according to clause 1, wherein the first filter further comprises a second chamber between the signal line and the second conducting layer, wherein the second chamber comprises the EM material.
3. The flexible planar transmission line according to clause 1 or 2, wherein the flexible planar transmission line has a first characteristic impedance, a distance between the signal line and at least one of the first electrically conducting layer and the second electrically conducting layer of the first filter is adapted to match a second characteristic impedance of a first portion of the flexible planar transmission line containing the first filter to the first characteristic impedance.
4. The flexible planar transmission line according to any of the preceding clauses, wherein the flexible planar transmission line has a first characteristic impedance, the cross-section of the signal line of the first filter of the transmission line is adapted to match the second characteristic impedance of the first portion of flexible planar transmission line containing the first filter to the first characteristic impedance.
5. The flexible planar transmission line of any of the preceding clauses further comprising a second filter configured to attenuate higher order modes.
6. The flexible planar transmission line of clause 5, wherein the flexible planar transmission line further comprises a concatenation of alternately the first filter and the second filter.
7. The flexible planar transmission line of clause 5 or 6, wherein the flexible planar transmission line has a first width $W_L$, the second filter comprises a first electrically conducting wall and a second electrically conducting wall respectively at either side of and parallel to the signal line and connecting the first and second electrically conducting layers, and a second width $W_g$ between first conducting wall and second conducting wall is smaller than the first width $W_L$.
8. The flexible planar transmission line of clause 7, wherein the first electrically conducting wall comprises first conducting vias arranged at a first line besides and parallel to the signal line and the second electrically conducting wall comprises second electrically conducting vias arranged along a second line besides and parallel to the signal line.
9. The flexible planar transmission line according to any of the clauses 5-8, wherein the flexible planar transmission line has the first characteristic impedance, a distance between the signal line and at least one of the first electrically conducting layer and the second electrically conducting layer of the second filter is adapted to match a third characteristic impedance of a second portion of the flexible planar transmission line containing the second filter to the first characteristic impedance.
10. The flexible planar transmission line according to any of the clauses 5-9, wherein the flexible planar transmission line has the first characteristic impedance, the cross-section of the signal line of the second filter of the transmission line is adapted to match the third characteristic impedance of the second portion of the flexible planar transmission line containing the second filter that is equal to the first characteristic impedance.
11. The flexible planar transmission line according to any of the preceding clauses, wherein the signal line of the first filter is conforming a meander shape.
12. The flexible planar transmission line according to any of the preceding clauses, wherein the EM absorptive material comprises EM-absorptive particles and a binder.
13. The flexible planar transmission line according to clause 12, wherein the EM absorptive particles comprise electrically conducting particles and electrically resistive particles.
14. The flexible planer transmission line according to clause 13, wherein the electrically conductive particles comprise at least one of Cu, Fe, FeO, $Fe_2O_3$, NiCr, Pt, Indium Tin Oxide, ITO, brass, bronze, stainless steel, Carbon, C.
15. The flexible planer transmission line according to clause 13, wherein the electrically conductive particles comprise at least one Carbon, C, Ge, Se, and Si.
16. The flexible planar transmission line according to any of the clauses 12-15, wherein the binder is one of liquid polyimide, polytetrafluoroethylene, PTFE, resin, polyurethane, fluorinated ethylene propylene, FEP, and ethylene tetrafluoroethylene, ETFE.
17. Electronic device comprising a transmission line according to any one of the clauses 1-16.

The invention claimed is:

1. A flexible planar transmission line for communication between a first electronic device and a second electronic device, the flexible planar transmission line comprising:
- a first conducting layer;
- a dielectric layer;
- a second conducting layer;
- a signal line provided in the dielectric layer; and
- a plurality of pairs, wherein each pair of the plurality of pairs includes a first filter and a second filter, wherein the plurality of pairs are arranged electrically in a series in a concatenation such that the flexible planar transmission line alternates the first filter and the second filter, wherein the first filter is arranged to attenuate frequency components of a signal, wherein the first filter further comprises a first chamber between the signal line and the first conducting layer, wherein the first chamber comprises an electro-magnetic (EM) absorbing material, and the second filter is arranged to attenuate higher order modes of the signal.

2. The flexible planar transmission line according to claim 1, wherein the first filter further comprises a second chamber between the signal line and the second conducting layer, and wherein the second chamber comprises the EM absorbing material.

3. The flexible planar transmission line according to claim 1, wherein the flexible planar transmission line has a first width, the second filter comprises a first electrically conducting wall and a second electrically conducting wall respectively at either side of and parallel to the signal line, the first electrically conducting wall and the second electrically conducting wall connecting the first and second electrically conducting layers, and a second width between first conducting wall and second conducting wall is smaller than the first width.

4. The flexible planar transmission line of claim 3, wherein the first electrically conducting wall comprises first conducting vias arranged at a first line besides and parallel to the signal line and the second electrically conducting wall comprises second electrically conducting vias arranged along a second line besides and parallel to the signal line.

5. The flexible planar transmission line according to claim 1, wherein the flexible planar transmission line comprises a transmission portion having a first characteristic impedance, a first filter portion comprising the first filter, and a second filter portion comprising the second filter, the first filter portion having a second characteristic impedance, the second filter portion having a third characteristic impedance and the second characteristic impedance and/or the third characteristic impedance match the first characteristic impedance.

6. The flexible planar transmission line according to claim 5, wherein a cross-section of the signal line of the second filter portion is adapted to match the second characteristic impedance of the first filter portion to the first characteristic impedance of the transmission section.

7. The flexible planar transmission line according to claim 5 wherein a distance between the signal line and at least one of the first electrically conducting layer and the second electrically conducting layer in the second filter portion is adapted to match the third characteristic impedance of the second filter portion of the flexible planar transmission line to the first characteristic impedance.

8. The flexible planar transmission line according to claim 7 wherein the cross-section of the signal line of the second filter portion is adapted to match the third characteristic impedance to the first characteristic impedance.

9. The flexible planar transmission line according to claim 1, wherein a pattern of the signal line of the first filter is a serpentine pattern.

10. The flexible planar transmission line according to claim 1, wherein the EM absorptive material comprises EM-absorptive particles and a binder.

11. The flexible planar transmission line according to claim 10, wherein the EM absorptive particles comprise electrically conducting particles, semi-conductive particles and electrically resistive particles.

12. The flexible planer transmission line according to claim 10, wherein the electrically absorptive particles comprise at least one of Al, Cu, Fe, FeO, Fe2O3, NiCr, Pt, Indium Tin Oxide, ITO, brass, bronze, stainless steel, Carbon, C, Ge, Se, Si.

13. The flexible planar transmission line according to claim 10, wherein the binder is one of liquid polyimide, polytetrafluoroethylene, PTFE, resin, polyurethane, fluorinated ethylene propylene, FEP, and ethylene tetrafluoroethylene, ETFE.

14. An electronic device comprising:

a flexible planar transmission line, wherein the flexible planar transmission line provides communication with a further electronic device, wherein the flexible planar transmission line includes a first conducting layer, a dielectric layer, a second conducting layer, a signal line provided in the dielectric layer, and a plurality of pairs, wherein each pair of the plurality of pairs includes a first filter and a second filter, and wherein the plurality of pairs are arranged electrically in a series in a concatenation such that the flexible planar transmission line alternates the first filter and the second filter, wherein the first filter is arranged to attenuate frequency components of a signal, wherein the first filter further comprises a first chamber between the signal line and the first conducting layer, wherein the first chamber chamber comprises an electro-magnetic (EM) absorbing material, and the second filter is arranged to attenuate higher order modes of the signal.

15. The electronic device according to claim 14, wherein the first filter comprises a second chamber between the signal line and the second conducting layer, and wherein the second chamber comprises the EM absorbing material.

16. The electronic device according to claim 14, wherein the flexible planar transmission line has a first width, the second filter comprises a first electrically conducting wall and a second electrically conducting wall respectively at either side of and parallel to the signal line, the first electrically conducting wall and the second electrically conducting wall connecting the first and second electrically conducting layers, and a second width between first conducting wall and second conducting wall is smaller than the first width.

17. The electronic device according to claim 16, wherein the first electrically conducting wall comprises first conducting vias arranged at a first line besides and parallel to the signal line and the second electrically conducting wall comprises second electrically conducting vias arranged along a second line besides and parallel to the signal line.

18. The electronic device according to claim 14, wherein the flexible planar transmission line comprises a transmission portion having a first characteristic impedance, a first filter portion comprising the first filter, and a second filter portion comprising the second filter, the first filter portion having a second characteristic impedance, the second filter portion having a third characteristic impedance and the second characteristic impedance and/or the third characteristic impedance match the first characteristic impedance.

19. The electronic device according to claim 18, wherein a cross-section of the signal line of the second filter portion is adapted to match the second characteristic impedance of the first filter portion to the first characteristic impedance of the transmission section.

20. The electronic device according to claim 18, wherein a distance between the signal line and at least one of the first electrically conducting layer and the second electrically conducting layer in the second filter portion is adapted to match the third characteristic impedance of the second filter portion of the flexible planar transmission line to the first characteristic impedance.

* * * * *